United States Patent
Hebbale et al.

[19]

[11] Patent Number: 6,146,305
[45] Date of Patent: Nov. 14, 2000

[54] SIX SPEED PLANETARY TRANSMISSION WITH TWO SIMPLE PLANETARY GEAR SETS

[75] Inventors: Kumaraswamy V. Hebbale; Sekhar Raghavan; Patrick Benedict Usoro, all of Troy, Mich.

[73] Assignee: General Motors Corporation, Detroit, Mich.

[21] Appl. No.: 09/383,429

[22] Filed: Aug. 27, 1999

[51] Int. Cl.$^7$ ...................................................... F16H 3/62
[52] U.S. Cl. ............................................................. 475/284
[58] Field of Search ................................. 475/271, 284, 475/296

[56] References Cited

U.S. PATENT DOCUMENTS

| | | | |
|---|---|---|---|
| 3,946,623 | 3/1976 | Murakami et al. | 475/276 |
| 4,638,688 | 1/1987 | Hiraiwa | 475/284 |
| 5,567,201 | 10/1996 | Ross | 475/284 |
| 5,816,972 | 10/1998 | Park | 475/284 |
| 5,830,102 | 11/1998 | Coffey | 475/285 |
| 5,984,825 | 11/1999 | Hebball et al. | 475/284 |
| 5,997,429 | 12/1999 | Raghavan et al. | 475/284 |
| 6,007,450 | 12/1999 | Raghavan et al. | 475/271 |

*Primary Examiner*—Sherry Estremsky
*Attorney, Agent, or Firm*—George A. Grove

[57] ABSTRACT

A powertrain has an engine-driven power transmission that selectively provides six forward speed ratios, a neutral condition and a reverse speed ratio. The power transmission includes two simple planetary gear sets that are continuously interconnected between two members and selectively interconnected between two other members through a selectively engageable rotating torque-transmitting mechanism. The ring gear member of one of the planetary gear sets is continually connected with an output shaft. Three selectively engageable rotating torque-transmitting mechanisms connect a member of each planetary gear set as well as the interconnected members with an input shaft. Two selectively engageable stationary torque-transmitting mechanisms inhibit the rotation of two members of one of the planetary gear and one member of the other planetary gear set when the selectively engageable interconnection is active.

8 Claims, 1 Drawing Sheet

| STICK DIAGRAM | | TORQUE TRANSMITTING MECHANISM | | | | | |
|---|---|---|---|---|---|---|---|
| GEAR | RATIO | 22 | 24 | 26 | 28 | 30 | 32 |
| REV | 2.50 | | G | | X | | X |
| NEU | – | | | | O | | O |
| FIRST | 4.00 | G | | | X | | X |
| SECOND | 2.17 | | X | | X | X | |
| THIRD | 1.33 | | | X | X | X | |
| FOURTH | 1.000 | | X | X | | O | |
| FIFTH | 0.71 | | | X | | X | X |
| SIXTH | 0.60 | X | | X | | | X |
| X: APPLIED, G: APPLIED (GARAGE SHIFT), O: APPLIED WITH NO LOAD | | | | | | | |

SIX SPEED PLANETARY TRANSMISSION WITH TWO SIMPLE PLANETARY GEAR SETS

TECHNICAL FIELD

This invention relates to multi-speed power transmissions having two planetary gear sets controlled to establish six forward speed ratios.

BACKGROUND OF THE INVENTION

In an effort to improve the overall performance of a vehicle while also reducing the mass of the vehicle, the number of speed ratios available through the transmission is increased. This permits a more efficient use of the engine operating range while also reducing the size of the engine. The increased number of speed ratios allows for a higher low gear ratio which will result in a reduced size torque converter.

The number of forward speed ratios in power transmissions has increased from two to five over a number of years. Many of the five speed transmissions incorporate two or three interconnected simple or compound planetary gear sets and five or six selectively engageable clutches or brakes. These transmissions quite often include one or more bridging clutches when two interconnected planetary gear sets are utilized. One example of this type of power transmission can be seen in U.S. Pat. No. 5,830,102 issued to Coffey on Nov. 3, 1998.

Currently many manufacturers are considering increasing the number of ratios to six or seven. These transmissions generally contain three planetary gear sets. One such transmission is seen in U.S. Pat. No. 3,946,623 issued Mar. 30, 1976. This prior art transmission incorporates four interconnected planetary gear sets, three clutches and four brakes when more than five speed ratios are to be attained.

SUMMARY OF THE INVENTION

It is an object of the present invention to provide an improved multi-speed power transmission having two simple planetary gear sets.

In one aspect of the present invention, a powertrain has two planetary gear sets, four clutches and two brakes that are controlled to establish six forward speed ratios and a reverse speed ratio. In another aspect of the present invention, the two planetary gear sets are of the simple, i.e., single pinion gear, and the ring gear of one of the planetary sets is continually connected with an output shaft.

In yet another aspect of the present invention, the planetary gear sets can be fully disconnected from an input shaft to establish a neutral condition. In still another aspect of the present invention, one of the clutches is selectively engaged to interconnect the two planetary gear sets. In a further aspect of the present invention, the two planetary gear sets have a continuous interconnection between a sun gear of one set and a ring gear of the other set.

In a yet further aspect of the present invention, three of the clutches are selectively engaged to provide a drive connection from the input shaft to a sun gear, a carrier assembly and the sun/ring interconnection, respectively.

DESCRIPTION OF AN EXEMPLARY EMBODIMENT

Figures 1, 2:
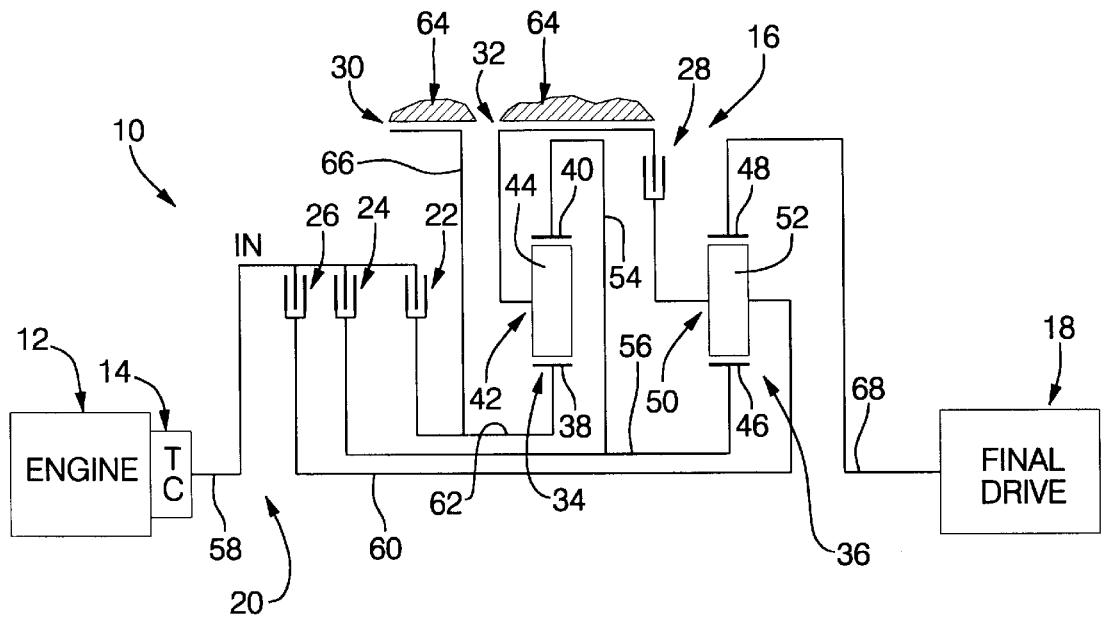
FIG. 1 is a schematic representation of a powertrain incorporating the present invention.
FIG. 2 is a truth table describing the engagement sequence of the torque transmitting mechanisms to provide the speed ratios in the planetary gear arrangement included in the powertrain of FIG. 1.

A powertrain 10 has an engine 12, a torque converter 14, a planetary gear arrangement 16, and a final drive gearing 18. The engine 10, torque converter 14 and final drive gearing 18 are conventional mechanisms that are well known to those skilled in the art. The planetary gear arrangement 16 and the torque converter 14 are incorporated into a power transmission, generally designated 20. The power transmission 20 also includes a plurality of rotating torque-transmitting mechanisms or clutches 22, 24, 26, and 28 and two stationary torque transmitting mechanisms or brakes 30 and 32. The torque transmitting mechanisms 22, 24, 26, 28, 30, and 32 are conventional fluid-operated friction devices of either the disc type or band type.

The planetary gear arrangement 16 includes two simple planetary gear sets 34 and 36. The planetary gear set 34 includes a sun gear member 38, a ring gear member 40 and a planet carrier assembly member 42. The carrier assembly member 42 has a plurality of pinion gears 44, each of which are in constant mesh with both the sun gear member 38 and the ring gear member 40. Hence, the planetary gear set is a simple planetary gear set. The planetary gear set 36 includes a sun gear member 46, a ring gear member 48 and a planet carrier member 50 that has a plurality of pinion gears 52 each disposed in constant meshing relation with both the sun gear member 46 and the ring gear member 48. The planetary gear set 36 is also a simple planetary gear set.

The sun gear member 46 and the ring gear member 40 are continuously interconnected through a hub 54 and a sleeve shaft 56. The sleeve shaft 56 is selectively connectable with an input shaft 58 through the clutch 24. The carrier assembly member 50 is selectively connectable with the carrier assembly member 42 through the clutch 28 and with the input shaft 58 through a shaft 60 and the clutch 26. The sun gear member 38 is selectively connectable with the input shaft 58 through the clutch 22 and a sleeve shaft 62. The sun gear member 38 is also selectively connectable with a transmission housing 64 through a hub 66 and the brake 30. The carrier assembly member 42 is selectively connectable with the transmission housing 64 through the brake 32. The ring gear member 48 is continuously connected with the final drive 18 through a transmission output shaft 68.

To establish the reverse speed ratio, the clutch 28 and the brake 32 are engaged and the clutch 24 is engaged at a controlled rate to launch the vehicle. The reverse speed ratio is provided through the gear ratio established solely by the planetary gear set 36. The sun gear member 46 is an input member, the ring gear member 48 is an output member, and the carrier assembly member 50 is a reaction member. The clutch 28 and the brake 32 can remain engaged during the neutral condition, if desired, without creating a ratio path in the planetary gearing 16.

The first forward ratio is established by engaging the clutch 28 and the brake 32, and the clutch 22 is engaged at a controlled rate to launch the vehicle. The usefulness of maintaining the clutch 28 and the brake 32 through the neutral condition should now be obvious. The first forward ratio is an underdrive ratio provided by a combination of both planetary gear sets 34 and 36. The sun gear member 38 is the input member, the carrier assembly members 42 and 52 are the reaction members, and the ring gear member 48 is the output member.

The second forward ratio is established by engaging the clutch 24 and the brake 30 while disengaging the clutch 22 and the brake 32. The clutch 28 remains engaged. This is a double transition shift. The second forward ratio is an underdrive ratio provided by a combination of both planetary gear sets 34 and 36. The ring gear member 40 and the sun gear member 46 are driven by the input shaft 58, the sun gear member 38 is the reaction member and the ring gear member 48 is the output member.

The third forward ratio is established by simultaneously interchanging the clutch 24 and the clutch 26 while the clutch 28 and brake 30 remain engaged. This is a single transition shift. The third forward ratio is an underdrive ratio provided by a combination of both the planetary gear sets 34 and 36. Carrier assembly members 50 and 42 are driven by the input shaft 58, the sun gear member 38 is the reaction member and the ring gear member 48 is the output member.

The fourth forward ratio is established by the simultaneous interchange of the clutches 28 and 24. This is a single transition ratio interchange. The brake 30 remains engaged but does not transmit any torque during the fourth ratio. The fourth ratio is a one-to-one ratio or direct drive. The planetary set 36 is in a locked condition to provide the direct drive. The planetary gear set 34 is released from the input shaft 58.

The fifth forward ratio is established by the simultaneous interchange of the clutch 24 and the brake 32. This is a single transition ratio interchange. The carrier assembly member 50 is the input member, the sun gear member 46 is the reaction member and the ring gear member 48 is the output member. It should be noted that the brakes 30 and 32 hold the planetary gear set 34 stationary which in turn holds the sun gear member 46 stationary. The fifth forward ratio is an overdrive ratio that is established solely through the gear ratio brought about by the planetary action of the planetary gear set 36.

The sixth forward ratio is established by the simultaneous interchange of the brake 30 and the clutch 22. This is a single transition shift. The carrier assembly member 50 and the sun gear member 38 are both connected with the input shaft 58, the carrier assembly member 42 is the reaction member, and the ring gear member 48 is the output member. The sixth forward ratio is an overdrive ratio. The reverse rotation of the ring gear member 40 and the sun gear member 46 add to the forward rotation of the ring gear member 48. The sixth forward speed ratio is provided by a combination of both of the planetary gear sets 34 and 36.

The truth table shown in FIG. 2 describes the engagement pattern and an example of a numerical ratios for the gearing shown in FIG. 1. The numerical ratios were determined by employing a tooth ratio of ring gear member 40 to sun gear member 38 of 1.60 and a tooth ratio of ring gear member 48 to sun gear member 46 of 2.50. The overall ratio spread (first ratio/sixth ratio) is 6.67, which provides very good launch characteristics as well as good fuel economy for the vehicle.

The engagement and disengagement of the various torque-transmitting mechanisms will be best controlled by an electronic control unit, not shown. The design and operation of these electronic devices is well known. These controls generally include a programmable digital computer and sensors such as speed pickups and pressure transducers to name a few. The drawings and description are directed toward a transmission containing minimum content. That is the least number of components. It is possible and well within the state of the art to provide one-way torque-transmitting mechanisms and friction devices to permit free wheeler to clutch shifts and coast braking.

What is claimed is:

1. A power transmission comprising:

an input shaft operatively connected with a power source;

an output shaft operative to deliver power from the transmission;

a first simple planetary gear set having a sun gear member, a ring gear member, and a carrier assembly member;

a second simple planetary gear set having a sun gear member, a ring gear member, and a carrier assembly member;

means for continuously interconnecting a first member of each of the first and second simple planetary gear sets;

means including an interconnecting rotating torque-transmitting mechanism for selectively interconnecting a second member of each of the first and second simple planetary gear sets;

said ring gear of said second simple planetary gear set being continually connected with said output shaft;

a first selectively engageable rotating torque-transmitting mechanism disposed between said input shaft and a third member of said first simple planetary gear set;

a second selectively engageable rotating torque-transmitting mechanism disposed between said input shaft and said continuous interconnecting means;

a third selectively engageable rotating torque-transmitting mechanism disposed between said input shaft and said second member of said second simple planetary gear set;

a first selectively engageable stationary torque-transmitting mechanism for selectively restraining rotation of said third member of said first simple planetary gear set;

a second selectively engageable stationary torque-transmitting mechanism for selectively restraining rotation of said second member of said first simple planetary gear set and also restraining rotation of said second member of said second simple planetary gear set when said interconnecting rotating torque-transmitting mechanism is selectively interconnecting said second members of said first and second simple planetary gear sets; and said interconnecting torque-transmitting mechanism, said first, second, and third rotating torque-transmitting mechanisms, and said first and second stationary torque-transmitting mechanisms being selectively engaged in combinations of three during the transmission of power from the input shaft to the output shaft.

2. The power transmission defined in claim 1 further comprising:

said second simple planetary gear set being controlled to solely establish a reverse ratio and a penultimate of six forward ratios between the input shaft and the output shaft through the power transmission.

3. The power transmission defined in claim 2 further comprising:

said six forward speed ratios including three underdrive ratios, a direct drive ratio and two overdrive ratios, wherein said interconnecting torque-transmitting mechanism is engaged during said reverse drive ratio and said underdrive ratios.

4. The power transmission defined in claim 2 further comprising:

said third selectively engageable rotating torque-transmitting mechanism being engaged during four consecutive forward drive ratios including at least one overdrive ratio and at least one underdrive ratio.

5. A power transmission comprising:

an input shaft operatively connected with a power source;

an output shaft operative to deliver power from the transmission;

a first simple planetary gear set having a sun gear member, a ring gear member, and a carrier assembly member;

a second simple planetary gear set having a sun gear member, a ring gear member, and a carrier assembly member;

means for continuously interconnecting said ring gear member of first simple planetary gear set and said sun gear member of said second simple planetary gear set;

selectively engageable clutch means for selectively interconnecting said carrier assembly member of said first simple planetary gear set and said carrier assembly member of said second simple planetary gear set;

said ring gear of said second simple planetary gear set being continually connected with said output shaft;

a first selectively engageable rotating torque-transmitting mechanism disposed between said input shaft and said sun gear member of said first simple planetary gear set;

a second selectively engageable rotating torque-transmitting mechanism disposed between said input shaft and said continuous interconnecting means;

a third selectively engageable rotating torque-transmitting mechanism disposed between said input shaft and said carrier assembly member of said second simple planetary gear set;

a first selectively engageable stationary torque-transmitting mechanism for selectively restraining rotation of said sun gear member of said first simple planetary gear set;

a second selectively engageable stationary torque-transmitting mechanism for selectively restraining rotation of said carrier assembly member of said first simple planetary gear set and also restraining rotation of said carrier assembly member of said second simple planetary gear set when said clutch means is engaged to selectively interconnect said carrier assembly members of said first and second simple planetary gear sets; and said clutch means, said first, second, and third rotating torque-transmitting mechanisms, and said first and second stationary torque-transmitting mechanisms being selectively engaged in combinations of three during the transmission of power from the input shaft to the output shaft to establish six forward speed ratios and a reverse speed ratio.

6. The power transmission defined in claim 5 further comprising:

said second simple planetary gear set being controlled to solely establish a gear ratio during said reverse ratio and to solely establish a gear ratio during a penultimate of said six forward ratios between the input shaft and the output shaft of the power transmission.

7. The power transmission defined in claim 5 further comprising:

said first and second simple planetary gear sets being controlled to provide said six forward speed ratios including three underdrive ratios, a direct drive ratio and two overdrive ratios, wherein said clutch means is engaged during said reverse drive ratio and said underdrive ratios.

8. The power transmission defined in claim 7 further comprising:

said third selectively engageable rotating torque-transmitting mechanism being engaged during four consecutive forward drive ratios including at least one overdrive ratio and at least one underdrive ratio.

\* \* \* \* \*